United States Patent [19]
Marisetty et al.

[11] Patent Number: 5,768,598
[45] Date of Patent: Jun. 16, 1998

[54] METHOD AND APPARATUS FOR SHARING HARDWARE RESOURCES IN A COMPUTER SYSTEM

[75] Inventors: Suresh K. Marisetty, San Jose; Krishnan Ravichandran, Santa Clara, both of Calif.

[73] Assignee: Intel Corporation, Santa Clara, Calif.

[21] Appl. No.: 602,253

[22] Filed: Feb. 15, 1996

Related U.S. Application Data

[63] Continuation of Ser. No. 120,245, Sep. 13, 1993, abandoned.

[51] Int. Cl.$^6$ .................................................. G06F 13/24
[52] U.S. Cl. .................... 395/733; 395/284; 395/800.11; 395/500
[58] Field of Search .......................... 395/726, 500, 395/733, 734, 280, 306, 309, 284, 800.11, 800.15

[56] References Cited

U.S. PATENT DOCUMENTS

| | | | |
|---|---|---|---|
| 3,675,214 | 7/1972 | Ellis et al. | 395/500 |
| 3,938,101 | 2/1976 | Lewis et al. | 395/500 |
| 4,031,517 | 6/1977 | Hirtle | 395/500 |
| 4,365,294 | 12/1982 | Stokken | 395/325 |
| 4,441,154 | 4/1984 | McDonough et al. | 395/800 |
| 4,514,805 | 4/1985 | McDonough et al. | 395/725 |
| 4,727,480 | 2/1988 | Albright et al. | 395/500 |
| 4,812,975 | 3/1989 | Adachi et al. | 395/500 |
| 4,888,680 | 12/1989 | Sander et al. | 395/500 |
| 5,036,484 | 7/1991 | McCoy et al. | 395/500 |
| 5,038,279 | 8/1991 | Bertram et al. | 395/500 |
| 5,088,033 | 2/1992 | Binkley et al. | 395/500 |
| 5,140,687 | 8/1992 | Dye et al. | 395/500 |
| 5,175,853 | 12/1992 | Kardach et al. | |
| 5,321,840 | 6/1994 | Ahlin et al. | 395/700 |
| 5,335,338 | 8/1994 | Proesel | 395/500 |

*Primary Examiner*—Jack B. Harvey
*Assistant Examiner*—Xuong M. Chung-Trans
*Attorney, Agent, or Firm*—Blakely, Sokoloff, Taylor & Zafman

[57] ABSTRACT

A method and apparatus for sharing a logic block between multiple peripheral/input/output I/O devices. A method and apparatus for generating a first interrupt in response to a request from one of the devices. A second interrupt is also generated. The second interrupt is recognized before the first interrupt, such that the second interrupt is handled first and causes the logic block to be configured for the requested device. Then the first interrupt is then handled in which the request to the desired device is serviced using the reconfigured hardware.

31 Claims, 2 Drawing Sheets

METHOD AND APPARATUS FOR SHARING HARDWARE RESOURCES IN A COMPUTER SYSTEM

This is a continuation of application Ser. No. 08/120,245, filed Sep. 13, 1993, now abandoned.

FIELD OF THE INVENTION

This invention relates to the field of computer systems; particularly, the present invention relates to the field of hardware resource sharing in a computer system, wherein multiple hardware interface protocols and input/output device emulation are supported using a hardware logic block.

BACKGROUND OF THE INVENTION

Computer systems typically include a central processing unit (CPU) and multiple hardware resources. These hardware resources include input/output devices, such as display devices and printer/plotter devices, memory devices, power supplies, or any other devices that operate with the CPU to provide the computer system with functionality. These resources may be individual integrated circuits or separate systems within themselves.

In order for the various hardware resources to communicate with the CPU and each other, distinct interface protocols are used by each device. These protocols represent the handshaking that occurs between devices when communicating so that each of the devices knows how the other devices will respond and what each of the devices is sending. The interface protocol for a particular type of peripheral or I/O device may be unique or dictated by an industry standard.

There are numerous types of peripherals with distinct interfaces. In the prior art, multiple types of peripheral devices are integrated into a computer system by using hardware dedicated to each of multiple external interfaces. To support many different types of external interfaces, specific hardware must be dedicated to each external interface. This hardware may include space on the printed wiring board of the computer system. Since usually multiple peripherals and I/O devices are used in a system, there is a great need for hardware resources to support each of the devices. By requiring that a computer system accommodate multiple external interfaces, the cost of the computer system increases due to the increase in the board space required to support the multiple external interfaces. Thus, it is desirable to support multiple hardware interfaces without having to dedicate separate hardware resources to each of the peripherals or I/O devices.

One solution to providing separate external interfaces for each I/O device is to share hardware such that separate hardware is not dedicated solely to each device. In this case, common signal paths and interface elements may be shared by more than one device. The sharing of hardware decreases the cost of the system and helps reduce the required board space. By reducing the amount of board space required, the cost of the computer system itself is reduced. A reduction in the cost of a computer system is particularly advantageous to the personal computer industry.

Recently, programmable devices have emerged which can be programmed to provide different interfaces for different devices. An example of this type of device is a programmable gate array (PGA), such as one produced by Xilinx of San Jose, Calif. A PGA can be programmed to emulate the desired hardware interfaces and its associated functionality by loading the device with a fuse map. The fuse map programs RAM based cells to configure the gate arrays internally through the use of multiple connections. Therefore, by loading fuse maps, a PGA device may be programmed to provide any interface required, thereby supporting peripheral devices with multiple types of interfaces.

In order to support multiple interfaces, a PGA device must be programmed to support a particular interface when the device corresponding to that interface is going to be used. In the prior art, in order to program a desired interface, the application program currently being run must be interrupted. Also the operating system may also be required to program the PGA, such that the operating system may also be interrupted. Existing operating systems like DOS, Windows, Unix, do not support this capability. It is desirable to share hardware in order to support multiple peripherals and I/O devices transparently to any application in use and the operating system of the computer system.

One problem with sharing hardware is that an I/O device may be memory mapped, or a single I/O address may be shared by multiple I/O device interface hardware blocks. In either case, the identification of the I/O device becomes difficult. Thus, it is desirable to be able to reconfigure a hardware interface transparently to the operating system and the applications program regardless of whether the I/O device is mapped to the memory address space or each I/O device has a unique address for an I/O address range.

Another solution in the prior art is to only support a limited number of hardware devices and use emulation software to accommodate hardware that is not present in the system. In such a system, if an applications program is designed to operate with a specific type of peripheral or I/O devices and that peripheral or device was not part of the computer system, all accesses to that hardware would be emulated in software. The results of the emulation would provide an indication to the applications program that the access was completed, while in actuality, the access is converted to one which may be performed on the current hardware.

One problem associated with the use of emulation is that the applications program must be stalled while the emulation is performed. This represents a huge performance problem to the applications program. Therefore, it is desirable to have a method and apparatus for device emulation that is transparent to the applications program accessing the hardware.

The present invention provides support for multiple hardware interfaces and I/O device emulation by sharing hardware resources. In this manner, I/O devices are not required to have a unique address nor must they be mapped into the I/O address space of the CPU. The present invention uses a special interrupt sequencing mechanism to reconfigure hardware to support multiple interfaces. The support of the multiple interfaces in the present invention is accomplished by dynamically reconfiguring the hardware on an "as needed" basis, such that it is invisible to the application software and the operating system of the computer system.

SUMMARY OF THE INVENTION

It is an object of the present invention to program or reconfigure input/output (I/O) hardware transparent to the applications.

It is an object of the present invention to program or reconfigure input/output (I/O) hardware transparent to the applications and the operating system (OS) of the computer system.

This and other objects are provided by a method and apparatus for sharing a logic block between multiple peripheral/input/output I/O devices. The present invention includes a method and apparatus for generating a first interrupt in response to a request from one of the devices. A second interrupt is also generated. In one embodiment, the first interrupt is used to generate the second interrupt, which is transparent to the application currently being run and also the operating system at times. The second interrupt is recognized before the first interrupt. The second interrupt is handled first by an interrupt service routine that causes the logic block to be configured for the requested device. Then the first interrupt is handled and serviced later, wherein the request to the desired device is completed using the reconfigured hardware.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

A method and apparatus for hardware sharing and I/O device emulation is described. In the following detailed description of the present invention numerous specific details are set forth, such as specific interrupt names, numbers and types of I/O devices, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

OVERVIEW OF THE PRESENT INVENTION

The present invention is advantageously employed in a computer system optimized for application with compact size. Such applications particularly include small battery-powered personal computers of the types commonly referred to as laptops and notebooks. One preferred embodiment of such a computer system is described briefly below; however, it is understood that the present invention is not limited to this particular computer system designed and may be incorporated into virtually any processor-based system design.

The present invention provides a method and apparatus for supporting multiple hardware interfaces and for I/O device emulation through the use of shared hardware resources. The present invention uses multiple interrupts sequenced in a particular order and time to dynamically reconfigure the shared hardware resources transparent to the application software and operating system to provide different external interfaces, such that the computer system supports multiple hardware interfaces.

Figure 1:
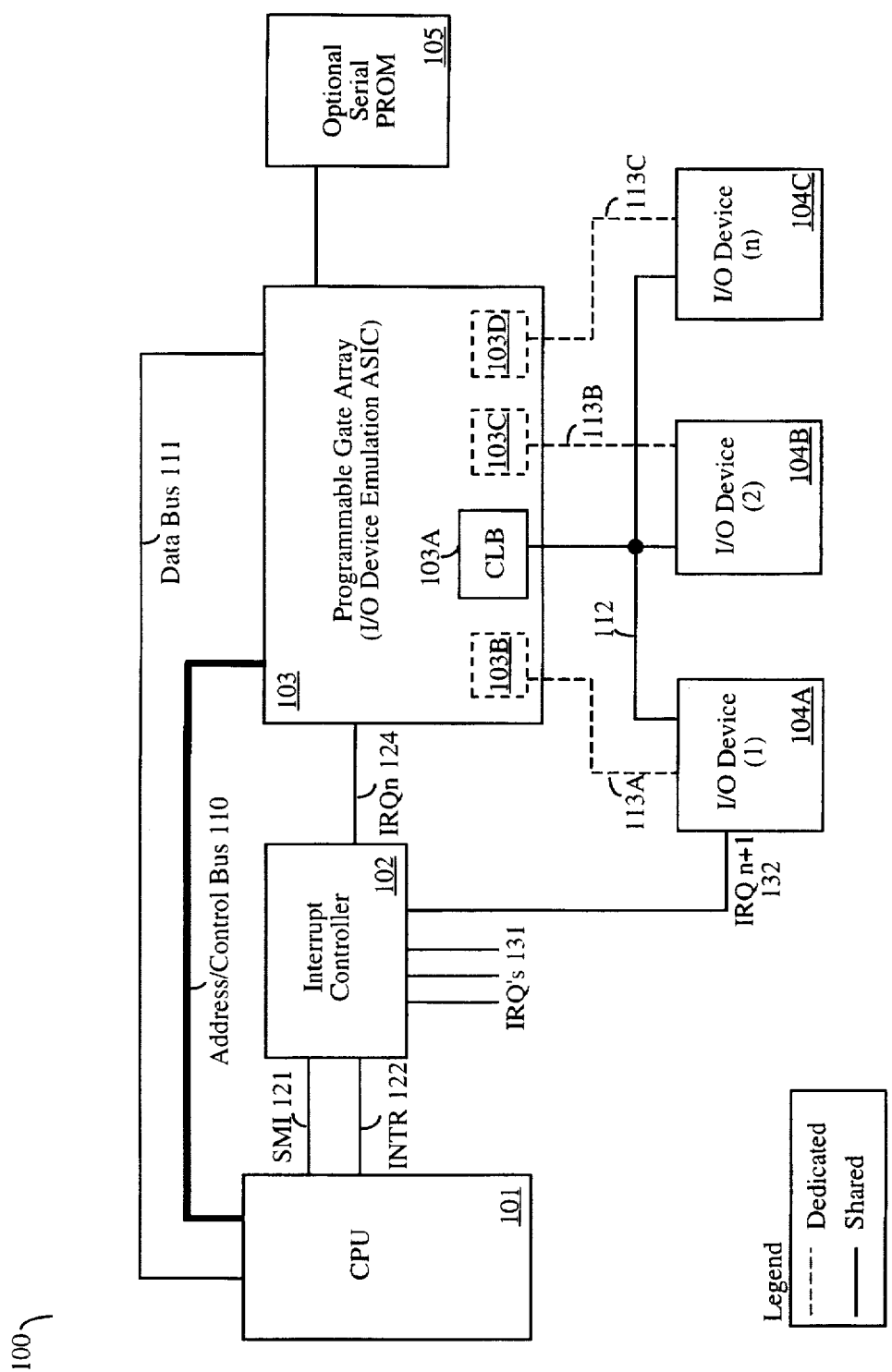
FIG. 1 is a block diagram of one embodiment of the computer system of the present invention.

Referring to FIG. 1, a computer system 100 is shown. System 100 includes central processing unit (CPU) 101, interrupt controller 102, programmable gate array (PGA) 103, I/O devices 104A–104C, and optionally may include serial PROM 105. CPU 101 is an expanded central processing unit which includes a CPU, a memory controller, a cache controller, bus control logic and line buffers. In one embodiment, CPU 101 comprises an x86SL™ brand microprocessor manufactured by Intel Corporation, the corporate assignee of this invention. Such a computer system is compatible with the IBM™ PCAT Personal Computer. Throughout this description, certain terminology relating to the x86SL™ microprocessor, such as registered names, signal nomenclature, etc., is employed to describe the present invention. Such terminology is understood by practitioners in the field of the microprocessor design and will therefore not be explained at length herein.

CPU 101 is coupled to programmable gate array 103 using an address/control bus 110 and data bus 111. CPU 101 is also coupled to receive a system management interrupt (SMI) 121 and a standard interrupt INTR 122 from interrupt controller 102. In one embodiment, SMI 121 is received by CPU 101 on a hardware pin designed specifically for SMI 121. CPU 101 enters system management mode (SMM) in response to SMI 121. In one embodiment of the system management mode, the interrupt is handled using an interrupt routine that is transparent to any applications program currently being run. The interrupt routine may also be transparent to the operating system.

Interrupt controller 102 is coupled to receive a standard interrupt $IRQ_n$ 124 from programmable gate array 103. Interrupt controller 102 also receives interrupts, designated as IRQs from other devices in the computer system. I/O device 104A is coupled to interrupt controller 102 using interrupt $IRQ_{n+1}$.

I/O devices 104A–104C are coupled to programmable gate array 103. In one embodiment PGA 103 may be an I/O device emulation application specific integrated circuit (ASIC). In one embodiment, PGA 103 is a programmable gate array manufactured by Xilinx Corporation, of San Jose, Calif. I/O devices 104A–104C are coupled to shared logic block 103A in PGA 103 via shared bus 112. Note that each of the I/O devices 104A–104C may be coupled additionally to separate control logic blocks within PGA 103, such as blocks 103B–D, respectively, as shown by the dotted boxes, using dedicated buses, such as buses 113A–C. Thus, a particular I/O device may be both coupled to PGA 103 either using shared and dedicated buses, using only shared bus 112 or using only a dedicated bus, such as those depicted for I/O devices 104A–104C as being buses 113A–113C respectively. Also coupled to PGA 103 is an optional serial programmable read-only memory (PROM) 105.

Computer system 100 may include a separate I/O integrated circuit (I/C) having parallel ports, dual serial ports, real-time clock unit, dual programmable interrupt controllers, dual programmable timers, dual direct memory access (DMA) controllers, and a memory mapper for use in controlling I/O operations for computer system 100. In such an embodiment, interrupt controller 102 may be included within such an I/O chip. Note that in another embodiment, the functions of this I/O chip may be implemented on several ICs. The present invention also may include a single chip graphic interface comprising a graphics controller, such as a VGA graphics controller, a video memory controller and an interface for a flat panel display unit. Any necessary oscillator for refreshing a video frame buffer, such as a video memory comprised of dynamic random access memory (DRAM) device, could also be included.

Computer system 100 further comprises a random access memory (RAM) or other dynamic storage device (commonly referred to as main memory) for storing information and instructions to be executed by CPU 101. A read-only memory (ROM) and/or other static storage devices for storing static information and instructions for CPU 101, as well as a mass data storage device, such as a magnetic disk or optical disk and its corresponding disk drive, are also included in computer system 100. These have not been shown to avoid obscuring the present invention.

Note that all of the processing units, such as CPU 100, an I/O chip and the single chip graphics interface, communicate with one another and with other system components (such as expansion slots, keyboard controller, disk controller, etc.) via a system bus. The system bus may be an ISA bus, a PCI bus, or any one of a number of standard or non-standard buses. Also coupled to such a bus in one embodiment of the present invention are a display device, such as a cathode ray tube (CRT), for displaying information, an alphanumeric input device, including alphanumeric and other keys for communicating information and command selections to CPU 101, and a cursor control device, such as a mouse, trackball, or cursor direction keys, for communicating command selections and for controlling cursor movement on the display. A hard copy device, such as a printer or plotter, for printing instructions, data, or other information on a medium such as paper, film, or other similar types of media.

As is shown in FIG. 1, multiple I/O devices, such as I/O devices 104A–C, can be present in the system coupled to host CPU 101 through a special function ASIC or gate array, PGA 103. The interface, such as PGA 103, may be a logic device which may be programmed to provide a communication pathway between multiple I/O devices and peripheral devices and CPU 101.

Although only three I/O devices are shown, the computer system may include more or less peripherals and I/O devices. The number of peripheral devices that share hardware is limited by the number of devices that PGA 103 is able to accommodate. I/O devices 104A–C share a set of external bus lines 112. These external bus lines may include address, data, and control lines. Also, I/O devices 104A–C share the internal ASIC hardware (shared logic block 103A). I/O devices 104A–C may comprise keyboard and mouse controllers, graphics hardware, such as raster scan controllers, hard and floppy disk controllers, DMA controllers, speech and sound units, local and wide area network controllers, bus controllers, printers, plotters, serial and parallel controllers, or any I/O peripheral that may be coupled to the computer system.

The present invention is able to configure the shared logic block, designated (CLB) 103A according to the specification of a particular I/O device external interface protocol depending upon which I/O device currently desired for use by CPU 101. CPU 101 controls the configuration of PGA 103 so that CLB 103A is set up to permit the desired I/O or peripheral device to be accessed according to its external interface.

In one embodiment, to configure CLB 103A, a fuse map is downloaded from memory (not shown) using address/control bus 110 and data bus 111 under the direction of CPU 101. The fuse map causes connections within PGA 103 to be made such that the resulting interface is provided by PGA 103 under control of CPU 101. Once CLB 103A has been configured to provide the necessary interface protocol of the device, the request or access of that device may be completed.

The fuse map may be stored in the serial programmable read-only memory (PROM) 105 and downloaded to configure PGA 103. The configuring of PGA 103 by downloading the fuse map may also occur at initialization or reset.

CPU 101 controls the configuration of PGA 103 in response to SMI 121 being asserted. SMI 121 allows the execution of system-wide routines that are transparent to the operating system and the application currently run on the processor. As implemented in accordance with the following description, SMI 121 allows software, resident in the system basic input/output system (BIOS) or in device drivers that are shipped with the system in which the microprocessor is installed, to be executed in a manner that is entirely transparent to the software application, the operating system and the operating mode of the processor (e.g., real or protected mode). This software is referred to as the SMI handler. SMI 121 is serviced in an operating environment that underlies the operating system and is, therefore, always accessible regardless of the operating system installed in the processor or the application that may be running when SMI 121 is invoked. An interrupt that allows execution of system-wide routines that are transparent to the operating system and the application program is described in U.S. Pat. No. 5,175,853, issued to Kardach et al., entitled "Transparent System Interrupt", and is incorporated herein by reference.

It should be noted that the present invention may use either a system management interrupt or any highest priority interrupt that is transparent to the operating system and the applications or the applications only for SMI 121.

In the present invention, SMI 121 is asserted by interrupt controller 102. Interrupt controller 102 also asserts INTR 12 to CPU 101. In the present invention, interrupt controller 102 asserts INTR 122 in response to any of the IRQs 131, $IRQ_n$ 124 or $IRQ_{n+1}$ being asserted. In one embodiment, the IRQs 131, $IRQ_n$ 124 or $IRQ_{n+1}$ are asserted when their corresponding peripheral or I/P device(s) requests servive. The IRQs 131 are asserted by peripheral device in the computer system, such as those specified above, which do not share the hardware of PGA 103. The origin of any or all of the IRQs 131 may be a programmable gate array or other programmable logic devices which may be configured to provide support for multiple external interface protocols. The $IRQ_{n+1}$ asserted by I/O device 104A when I/O device 104A requests service. The $IRQ_n$ 124 is asserted by PGA 103 when either I/O device 104B or I/O device 104C requests service. In other words, IRQ 124 in the current embodiment is shared by I/O devices 104B–104C. In fact, the $IRQ_n$ may be two physical lines comprising IRQ's from each of 104B and 104C.

Figure 2:
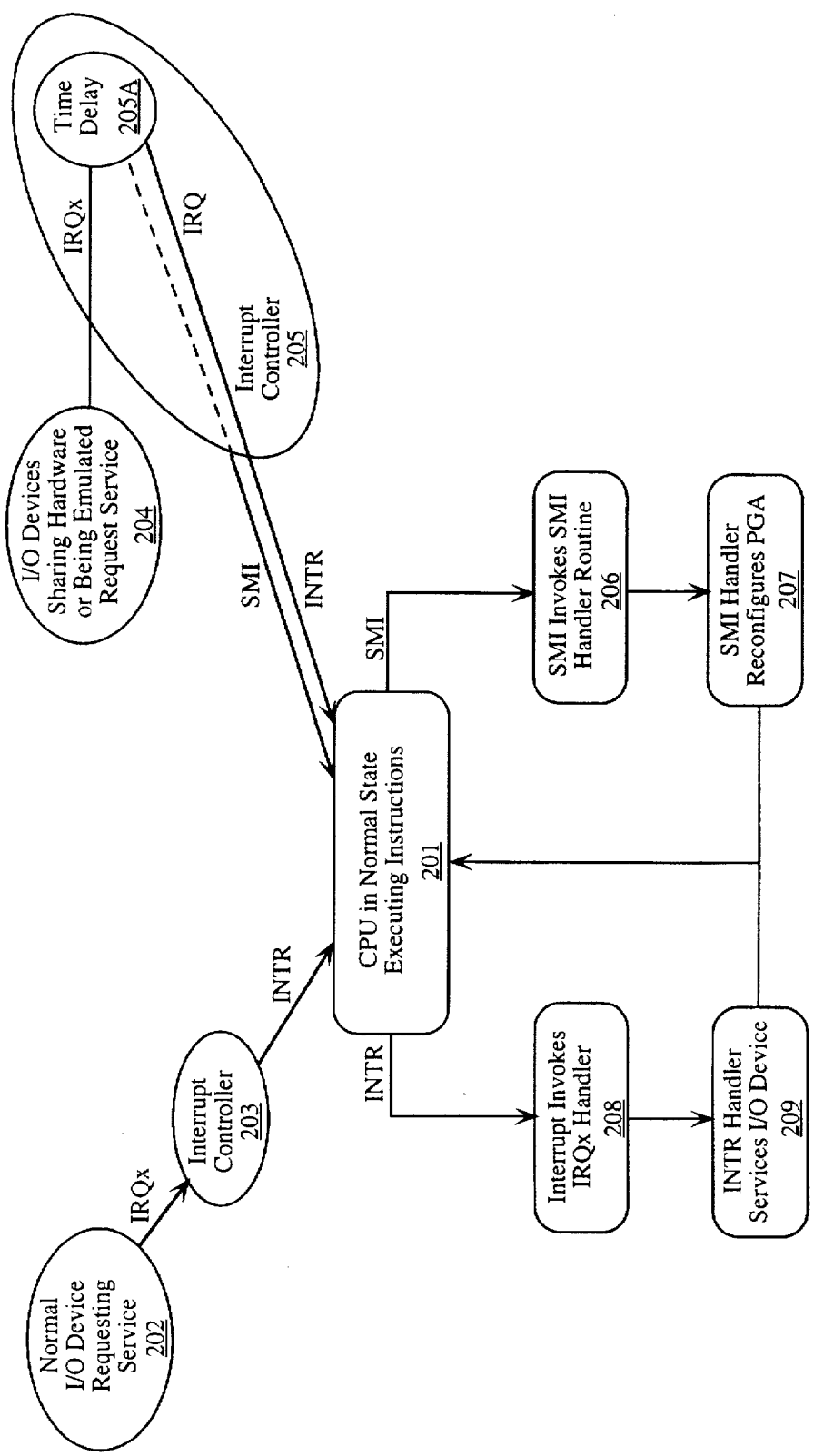
FIG. 2 is a state diagram depicting the operation of the present invention.

The operation of the present invention is described in a flowchart of FIG. 2. Referring to FIG. 2, in the present invention, CPU 101 is in the normal state. In the normal state, CPU 101 is executing instructions, usually in accordance with an applications program being run by CPU 101 (state 201). An operating system also controls the running of the applications program in a manner well-known in the art.

While in the normal state, if a normal I/O device requests service (e.g., an I/O device that does not share hardware that needs to be configured), it asserts its interrupt line IRQx, which is one of IRQs 131 (state 202). The asserted IRQx is received by interrupt controller 102. In response to the IRQx being generated, interrupt controller 102 asserts INTR 122 (state 203). In response to INTR 122 being generated, the interrupt handler designated for that interrupt $IRQ_x$ is invoked (state 208) and the INTR handler services the I/O device (state 209). After the I/O device has been serviced, the system returns to the normal state (state 201).

If one of the I/O devices sharing hardware requests service (state 204), an $IRQ_x$ is generated, such as $IRQ_x$ 124. When $IRQ_x$ 124 is generated, interrupt controller 102 generates SMI 121 followed by INTR 122 (state 205). In one embodiment, the IRQ$_x$ interrupt is used to generate SMI 121 (as indicated by the dotted lines). In the present invention, a time delay (state 205A) causes INTR 122 to be asserted later than SMI 121. The time delay staggers SMI 121 and INTR 122 by a few clocks. In this manner, SMI 121 will be addressed (i.e., handled) before INTR 122. However, SMI 121 and INTR 122 may be generated simultaneously (as well as Ext_SMI and IRQn 124) as long as SMI 121 is recognized before INTR 122. This may be ensured by giving SMI 121 a higher priority than INTR 122.

When SMI 121 is asserted, the SMI handler of CPU 101 is invoked to address the interrupt (state 206). In one embodiment, the SMI handler determines the source of the interrupt. In other words, the SMI handler determines which I/O device is requesting service. If the interrupt is shared by more than one device, the SMI handler may determine the source using status registers, by polling, etc. Once the I/O device requesting service has been identified, the SMI handler provides the appropriate routine to respond to the interrupt. In one embodiment, the SMI handler utilizes a software routine that reprograms PGA 103 to provide the interface for that particular I/O device (state 207). The software routine may be fetched from memory.

Once the reprogramming of PGA 103 has been completed, CPU 101 returns to state 201 to handle INTR 122. The INTR 122 invokes the interrupt handler for IRQx (state 209). The INTR handler services the I/O device requesting service in a manner well-known in the art (state 209). After the I/O device has been serviced, the system returns to the normal state (state 201).

In sum, a first interrupt is generated, such as IRQ$_x$ 124, that is not visible to the application supporting the target I/O device. The second interrupt, SMI 121, is only visible to the handler reconfiguring the shared hardware, or logic blocks. In one embodiment, the first interrupt is used to generate the second interrupt, even though the second interrupt is recognized before the first interrupt. Also, the second interrupt is transparent to the application and, in some embodiments, is transparent to both the application and the operating system.

In order to program the shared logic block CLB 103A, CPU 101 needs an indication as to which I/O device it is servicing. This is communicated to the CPU vis-a-vis IRQ line from the I/O device. In FIG. 1, IRQn+1 is coupled to interrupt controller 102 from I/O device 104A. I/O devices 104B-C share interrupt IRQ$_n$. CPU 101 determines which of the devices is requesting service through on-board interrupt status registers or by polling the I/O devices. In one embodiment, CPU 101 determines which I/O device is being accessed by looking at the address of the I/O instruction that it is using. This is satisfactory for dedicated hardware block as shown with the dashed lines. For shared I/O blocks, CPU 101 maybe using the same I/O address to address different I/O devices. In this situation, the present invention sequences interrupts to determine which I/O device is being accessed.

In one embodiment, one function implemented by the SMI handler is the reconfiguration of CLB 103A. To initialize the shared logic block CLB 103A, a fuse map is loaded into PGA 103. This programs PGA 103 so that CLB 103A provides the necessary hardware interface to access the I/O device requesting service. The fuse map programs RAM based cells within PGA 103, which configure the gate array internally by turning certain switches on and other switches off. The fuse map is stored in memory in the computer system. This memory could be maim memory, the optional serial PROM 105, or some other storage device.

In the present invention, the SMI handler of CPU 101 may be responsible for initializing the shared logic blocks of the programmable ASIC (e.g., PGA 103). In another embodiment, PGA 103 initializes itself from PROM 105.

The present invention also provides for I/O device emulation by sharing hardware resources. If one of the I/O devices coupled to CLB 103A is requesting service and is used in conjunction with an applications program that is designed to operate with a different type of hardware, the present invention could be used to provide an interface for the applications program to access the I/O device. The CLB 103A would still be configured by the SMI handler of CPU 101 in response to SMI 121. In this case, the handler also includes a routine to emulate the access to one which allows access to the I/O device.

Once the SMI handler is initialized and the PGA hardware is configured, the IRQ handler will then start communicating to the I/O device. The SMI handler which begins before the INTR makes the reconfiguration of the hardware transparent to the INTR handler. This makes the hardware sharing transparent to the operating system in the applications.

The present invention provides a mechanism to support multiple hardware interfaces and provide I/O device emulation by sharing hardware resource. Therefore, the present invention allows the computer system to accommodate multiple I/O devices while using a reduced amount of external interface for those devices. This corresponds to a reduction in the overall required board space on the computer for the computer, thereby reducing the cost of the computer system.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for sharing hardware resources has been described.

We claim:

1. A method for sharing hardware resources between a plurality of devices wherein the hardware resources includes a configurable logic block, said method comprising the steps of:

generating a first interrupt in response to a request for one of the plurality of devices;

generating a second interrupt, wherein the second interrupt is recognized before the first interrupt;

handling the second interrupt, including the step of dynamically reconfiguring hardware connections in the configurable logic block to provide a compatible interface to said one of the plurality of devices to enable access thereto; and then handling the first interrupt including the step of accessing said one of the plurality of devices such that a response to the request from said one of the plurality of devices is performed.

2. The method defined in claim 1 wherein the second interrupt is generated in response to the first interrupt.

3. The method defined in claim 1 wherein the first interrupt and the second interrupt are generated simultaneously.

4. The method defined in claim 3 wherein the second interrupt has a higher priority than the first interrupt, such that the second interrupt is recognized before the first interrupt.

5. The method defined in claim 3 wherein the first interrupt and second interrupt are sequenced, such that the second interrupt is recognized before the first interrupt.

6. The method defined in claim 1 wherein the hardware of the configurable logic block is configured transparently to the handling of the first interrupt.

7. A method for obtaining service for one of a plurality of devices coupled to a shared logic block in a computer system, wherein the shared logic block provides for communication between the computer system and the plurality of devices, wherein each of the plurality of devices has an interface protocol used when communicating in the computer system and wherein the plurality of devices are addressed using a single address, the method comprising the steps of:

generating a first interrupt in response to a service request from one of said plurality of devices;

generating a second interrupt in response to the first interrupt, wherein the second interrupt is recognized before the first interrupt;

invoking a first handler for handling the second interrupt, wherein the first handler dynamically reconfigures hardware connections in the shared logic block to create an interface for said one of the plurality of devices to allow access thereto; and then invoking a second handler for handling the first interrupt to service said one of the plurality of devices, wherein the first handler initializes the shared logic block transparently to the second handler, such that the shared logic block is configured to the interface protocol of said one of the plurality of devices transparently to an operating system to handle the service request.

8. The method defined in claim 7 wherein the first interrupt and second interrupt are generated simultaneously.

9. The method defined in claim 8 wherein the second interrupt has a higher priority than the first interrupt, such that the second interrupt is recognized before the first interrupt.

10. The method defined in claim 7 wherein the shared logic block is dynamically reconfigured transparently to the service request being completed.

11. A method for handling a request by one of a plurality of devices mapped to one location and using a shared logic block in a computer system, wherein the computer system is running an application program, and wherein each of the plurality of devices has an interface protocol required for use when communicating in the computer system, the method comprising the steps of:

identifying said one of the plurality of devices;

dynamically configuring hardware connections in the shared logic block, transparently to the application program, to create an external interface to support the interface protocol of said one of the plurality of devices; and accessing said one of the plurality of devices using the shared logic block.

12. The method defined in claim 11 wherein the step of identifying includes identifying said one of the plurality of devices by examining the location of an instruction being used.

13. The method defined in claim 11 wherein the step of identifying includes the step of generating a first interrupt by said one of the plurality of devices.

14. The method defined in claim 13 wherein the step of generating the first interrupt includes the step of generating a second interrupt that is recognized before the first interrupt and wherein said second interrupt causes the hardware of the shared logic block to be dynamically reconfigured to create an external interface to support the interface protocol of said one of the plurality of devices.

15. The method defined in claim 14 wherein the first and second interrupts are generated simultaneously.

16. The method defined in claim 15 wherein the first interrupt and the second interrupt are sequenced, such that the second interrupt is recognized before the first interrupt.

17. The method defined in claim 15 wherein the second interrupt has a higher priority than the first interrupt, such that the second interrupt is recognized before the first interrupt.

18. A computer system comprising:

a bus for communicating information;

a processor coupled to the bus to execute a plurality of instructions;

a plurality of devices for communicating information with the processor, wherein each of the plurality of devices communicates with the processor according to an interface protocol; and programmable logic coupled to the plurality of devices and the bus to provide a communication path between the plurality of devices and the bus, wherein the processor communicates with said plurality of devices through said programmable logic, wherein the programmable logic is programmed to dynamically reconfigure internal hardware connections therein, transparently to an application program and operating system running on the processor, to create an interface that conforms to the interface protocol of one of the plurality of devices when said one of the plurality of devices is to communicate with the processor.

19. The computer system defined in claim 18 wherein said one of the plurality of devices is to communicate with the processor in response to the execution of a instruction of the application program by said processor.

20. The computer system defined in claim 19 further comprising means coupled to the processor for generating an interrupt which is transparent to the operating system and the application program, and wherein the interrupt causes the processor to reprogram a shared logic block.

21. The computer system defined in claim 20 further comprising means coupled to said one of the plurality of devices for generating a first interrupt when said one of the plurality of devices is identified for communication with the processor, wherein said first interrupt causes generation of a second interrupt, wherein the second interrupt causes the processor to reprogram the shared logic block and the first interrupt causes communication to occur between said one of the plurality of devices and the processor after said shared logic block has been reconfigured.

22. The computer system defined in claim 21 wherein the first interrupt and the second interrupt are generated simultaneously and the second interrupt is recognized before the first interrupt.

23. The computer system defined in claim 22 wherein the second interrupt has a higher priority than the first interrupt.

24. The computer system defined in claim 21 wherein the first interrupt and the second interrupt are sequenced, such that the second interrupt is generated after and recognized before the first interrupt.

25. A computer system comprising:

a bus for communicating information;

a processor coupled to the bus to execute a plurality of instructions in support of an applications program;

a plurality of devices that operate with the processor, wherein each one of the plurality of devices communicates according to an interface protocol;

a programmable logic coupled to the plurality of devices and the bus as a pathway for communication between the processor and the plurality of devices, wherein the programmable logic is shared by the plurality of devices; and an interrupt controller coupled to receive a first signal from the programmable logic and to provide the processor with a first interrupt and a second interrupt, wherein the interrupt controller generates the first interrupt and the second interrupt in response to the first signal and wherein the second interrupt causes the processing means to dynamically reconfigure hardware connections in the programmable logic to create an interface for said one of the plurality of devices that conforms to the interface protocol of the said one of the plurality of devices and the first interrupt causes said one of the plurality of devices to be accessed, such that the programmable logic is reconfigured before said one of the plurality of devices is accessed.

26. The computer system defined in claim 25 wherein said one of the plurality of devices communicates with the processor in response to the execution of an instruction of the application program by said processor, and wherein the programmable logic is programmed transparently to the application program and operating system.

27. The computer system defined in claim 25 wherein the second interrupt is transparent to the operating system and the application program, and wherein the second interrupt causes the processor to reprogram a shared logic block.

28. The computer system defined in claim 25 wherein said first interrupt causes communication to occur between said one of the plurality of devices and the processor.

29. The computer system defined in claim 25 wherein the first interrupt and the second interrupt are generated simultaneously and the second interrupt is reconfigured before the first interrupt.

30. The computer system defined in claim 25 wherein the second interrupt has a higher priority than the first interrupt.

31. The computer system defined in claim 25 wherein the first interrupt is generated before the second interrupt, and wherein the first interrupt and the second interrupt are sequenced, such that the second interrupt is recognized before the first interrupt.

* * * * *